Figure 1:
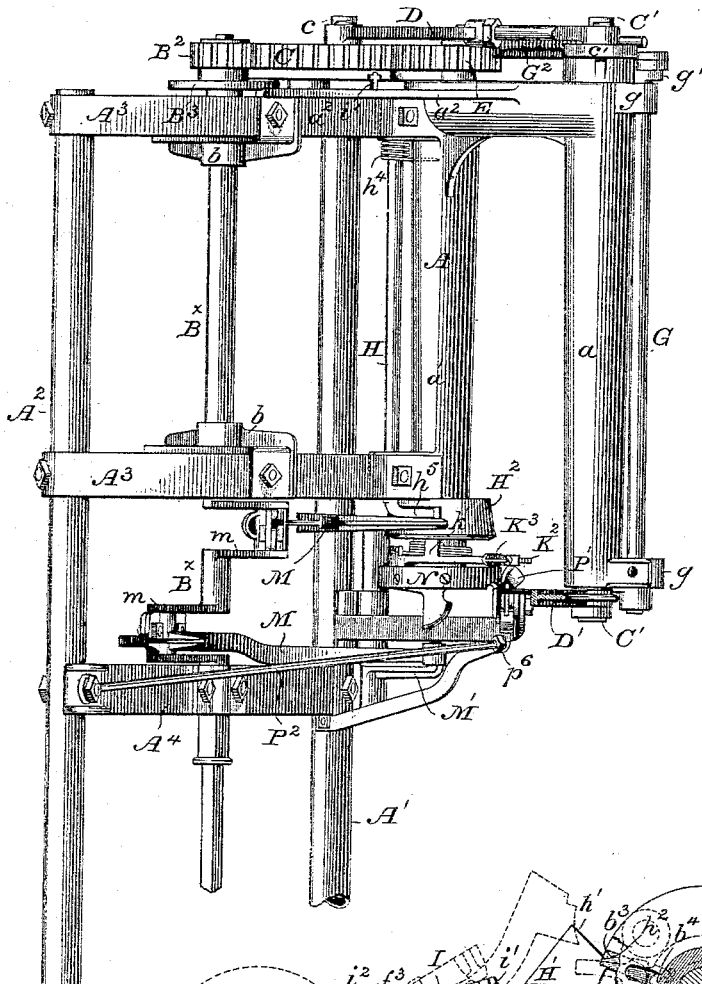

(No Model.) 8 Sheets—Sheet 1.
C. B. WITHINGTON.
GRAIN BINDER.

No. 399,108. Patented Mar. 5, 1889.

Witnesses,
Wm A. Skinkle
Geo. W. Young.

Inventor
Charles B. Withington.
By his Attorneys
Parmvan & Parmvan (No Model.)  8 Sheets—Sheet 2.

C. B. WITHINGTON.
GRAIN BINDER.

No. 399,108.  Patented Mar. 5, 1889.

Witnesses,
Wm. A. Skinkle
Geo. W. Young

Inventor,
Charles B. Withington.
By his Attorneys
Parkinson & Parkinson (No Model.)

8 Sheets—Sheet 3.

C. B. WITHINGTON.
GRAIN BINDER.

No. 399,108. Patented Mar. 5, 1889.

Witnesses
Wm. A. Skinkle
Geo. W. Young

Inventor
Charles B. Withington.
By his Attorneys
Parkinson & Parkinson

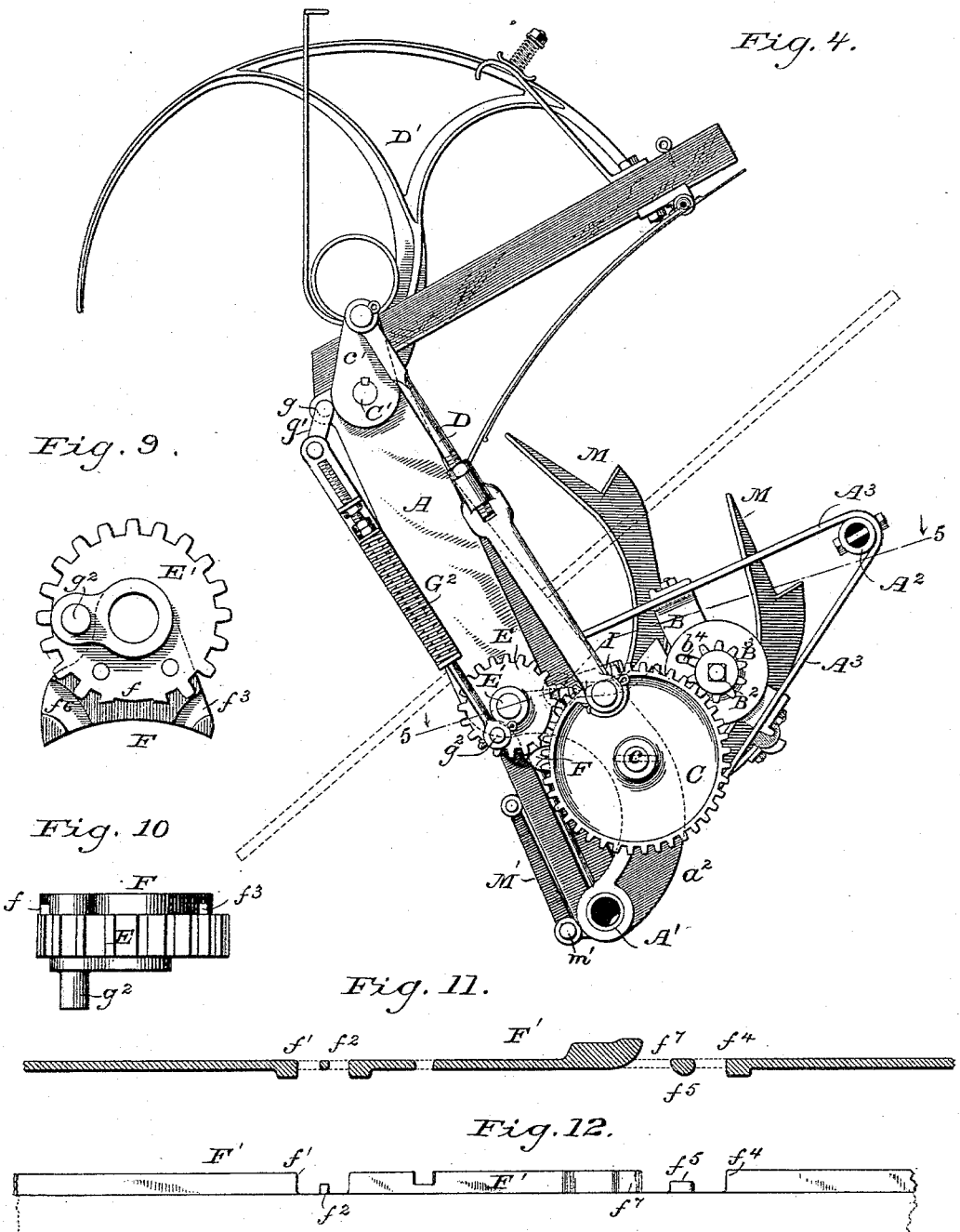

(No Model.) 8 Sheets—Sheet 5.
C. B. WITHINGTON.
GRAIN BINDER.
No. 399,108. Patented Mar. 5, 1889.
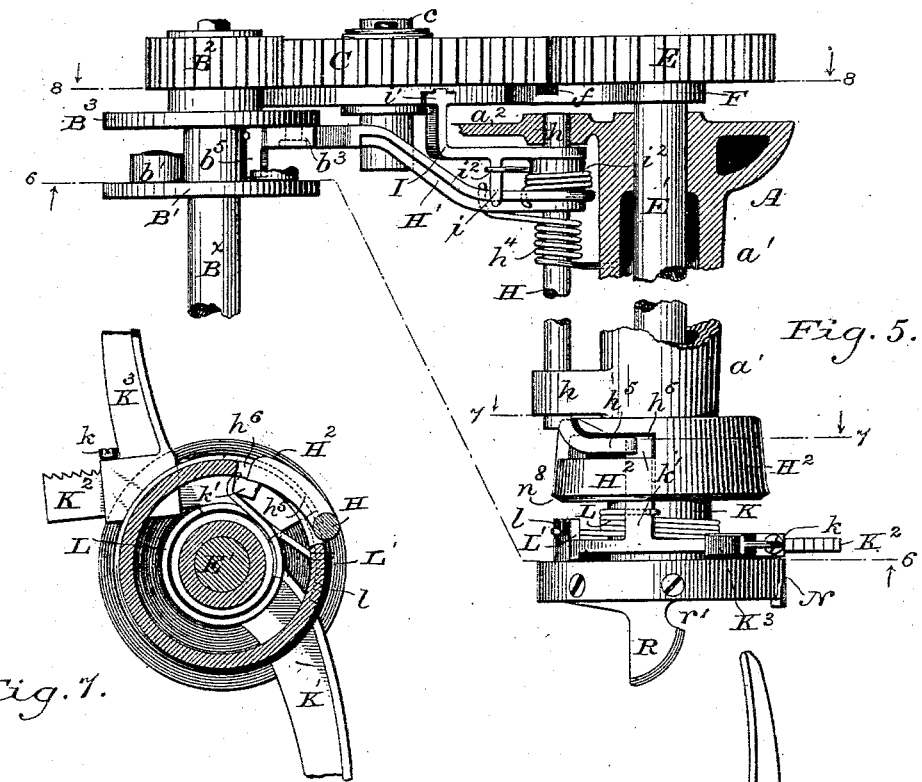
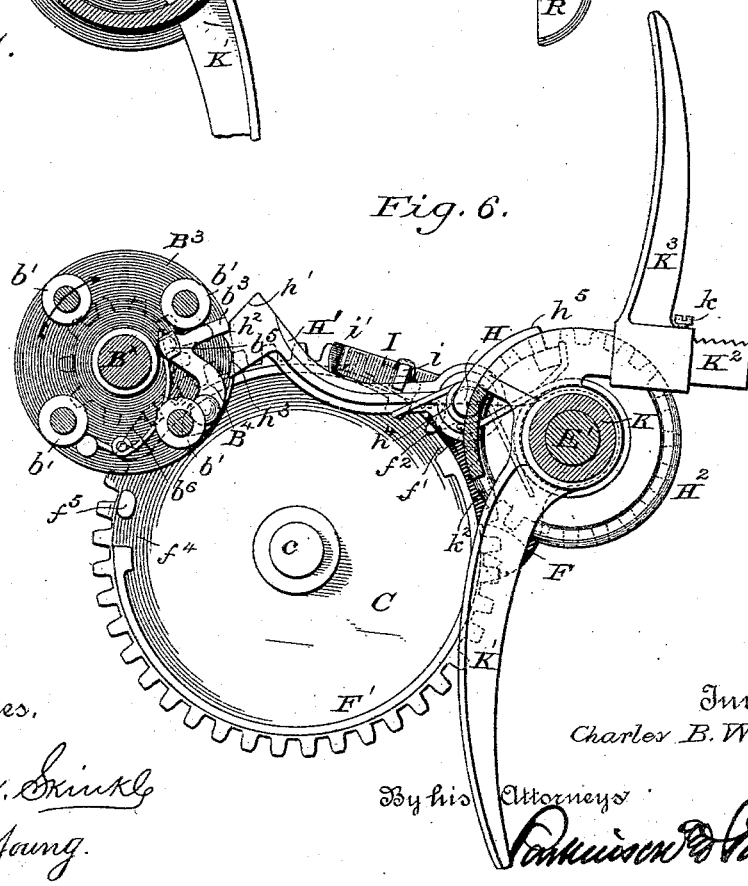
Witnesses.
Wm A. Skinkle
Geo. W. Young.
Inventor,
Charles B. Withington
By his Attorneys

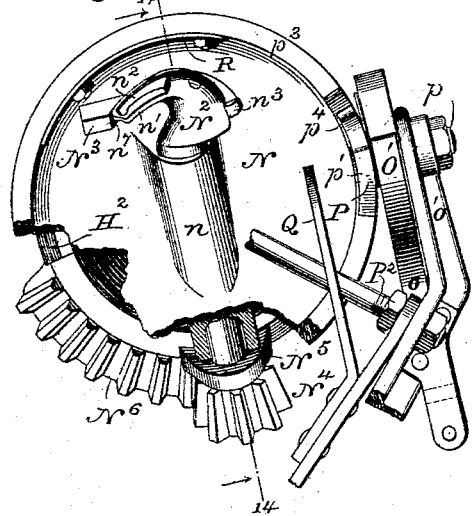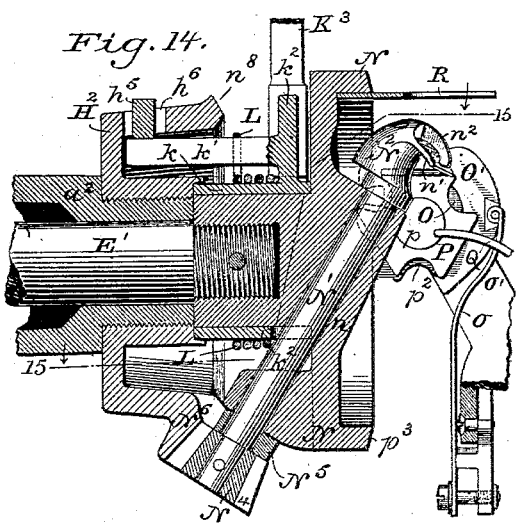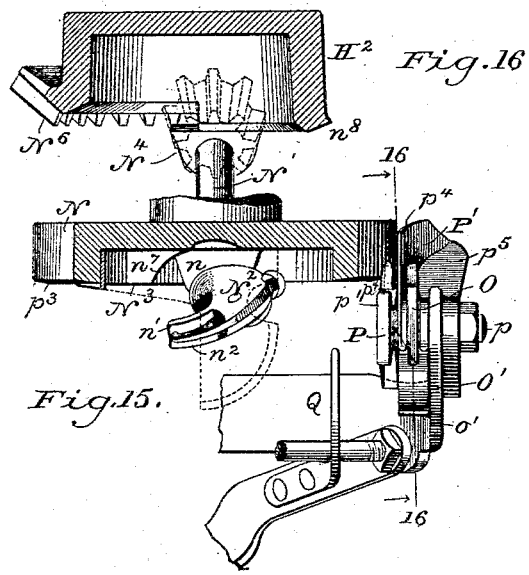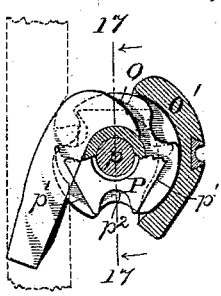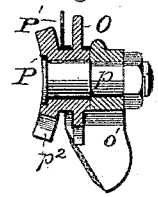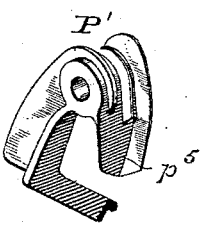

(No Model.) 8 Sheets—Sheet 7.

C. B. WITHINGTON.
GRAIN BINDER.

No. 399,108. Patented Mar. 5, 1889.

Witnesses
Wm A. Skinkle
Geo. W. Young.

Inventor
Charles B. Withington.
By his Attorneys
Parmisan & Parmisan (No Model.)  8 Sheets—Sheet 8.

C. B. WITHINGTON.
GRAIN BINDER.

No. 399,108.  Patented Mar. 5, 1889.

Witnesses
Wm. A. Skinkle.
Arthur Johnson.

Inventor
Charles B. Withington
By his Attorneys
Parkinson & Parkinson

UNITED STATES PATENT OFFICE.

CHARLES B. WITHINGTON, OF JANESVILLE, WISCONSIN.

GRAIN-BINDER.

SPECIFICATION forming part of Letters Patent No. 399,108, dated March 5, 1889.

Application filed April 25, 1887. Serial No. 235,977. (No model.)

*To all whom it may concern:*

Be it known that I, CHARLES B. WITHINGTON, a citizen of the United States of America, residing at Janesville, in the county of Rock and State of Wisconsin, have invented certain new and useful Improvements in Grain-Binders, of which the following is a specification.

Nearly all modern binders are of the same general type, irrespective of the manufacturer. They have a post-frame or main bracket with overhanging and subtending arms for the support of the tyer and needle shafts, outside tripping and compressing fingers supported from beneath the binding-table, packers moving up from beneath said table to urge the grain forward wisp by wisp, and controlled in their movements by a revolving crank-shaft midway of their length and by pendent links to which the heel ends are jointed. The binder-arm shaft is beneath the decking or table and the binder-arm rises therethrough, and a tyer-shaft bearing at one end the main gear has at the other end a cam-wheel actuating the holding, knotting, and cutting mechanism above the binding-throat, while the main gear is driven from the packer-shaft by a chain or by intermediate idlers, operates the binder-arm by means of a pitman connected to a crank on the binder-arm shaft, and alternately holds the trip-finger up against the grain and moves it forward to compact the grain, and again carries it beneath the decking to permit the discharge of the bound sheaf by means of a spring-link attached to a lever pivoted on the frame and controlled by a cam-track in said main gear. The trip-finger, which in this construction also acts as a compressor, has a vibratory movement to drop it beneath the table and return it to effective position. The main gear, when the binder is out of action, is engaged by a back-lash-dog, which prevents retrograde movement, but does not positively lock against movement in the other direction.

In my present invention I have arranged the tying-head beneath the grain-table and placed the binder-arm above. The main gear, mounted on a stub-axle outsetting from a web or hanger on the inner and lower side of the main bracket, meshes directly with and is driven by the trip-pinion on the packer-shaft, and by means of a pitman connects with a crank on a needle-shaft journaled in the overhung arm of said main bracket, thereby operating the needle or binder arm, and, meshing also with a stop-motion pinion on the outer end of the tyer-shaft journaled in the subtending arm of the main bracket, it imparts rotation to said shaft at the proper time in the binding operation. A spring-link extends from a wrist-pin on this stop-motion pinion to a crank upon a compressor-shaft journaled in ears near the top of the main bracket and extending parallel with its overhung arm, thereby actuating the compressor at the inner end of said shaft to move forward just after the knotter is started to give additional compression to the gavel while the knot is being tied, and then to move outward and upward to open the passage for the discharge of the bound sheaf, and, finally, to move downward again to close the passage against the escape of the incoming gavel.

A trip finger is mounted upon a sleeve embracing the tyer-shaft and revolving with it, but capable of a limited independent play thereabout, and connects with the trip-shaft while the tyer-shaft is at rest, so as to rock said trip-shaft and release the trip-latch as grain is packed against it. In the rotation of the tyer-shaft, which begins after the binder-arm has laid the cord around the gavel, this trip-finger is carried beneath the table, and an ejector-finger which projects from the sleeve on the opposite side from the trip-finger is brought up to eject the bound sheaf, and then in the continued revolution of said shaft both trip-finger and ejector are brought around to their initial position. The packers, which carry the grain wisp by wisp against the trip-finger, are mounted about midway of their length upon the crank-shaft which carries the trip-clutch and trip-pinion, as heretofore; but instead of being supported at the heel ends by links pendent from a pivot on the frame they are carried by links which upstand from their pivot on the frame, thus not only effecting a change in the movement of the packers, but also lifting them closer to the decking, and enabling the attachment to be brought much nearer to the ground should it be desired to use it on a low-level machine. The main gear, and consequently the whole binding mechanism, is positively locked against movement while out of action by means of a dog taking into a notch in said main gear, or any appropriate wheel in the driving-train, and lifted out of said notch by the trip-latch, or by other suitable connection with the tripping mechanism, through the agency of the trip-finger as it recedes before the incoming gavel. A stationary cord-holder is employed; but the knotter, which preferably is of the usual tying-bill form, is carried in a rotating head or stock at the end of the tyer-shaft, and in the binding operation starts from a position slightly in advance of the holder and winds up the cord toward said holder, completing the knot as it passes, and then in the continued revolution of the stock backs away from the holder with its jaws trending theretoward until the knot has been wrenched from it, or until it is released from the knot, finally being brought by the completion of the full revolution of the tyer-shaft and stock to its starting position, where it stops in readiness to again receive the cord.

Various other features and details of my invention will appear from the ensuing description.

Figure 8:
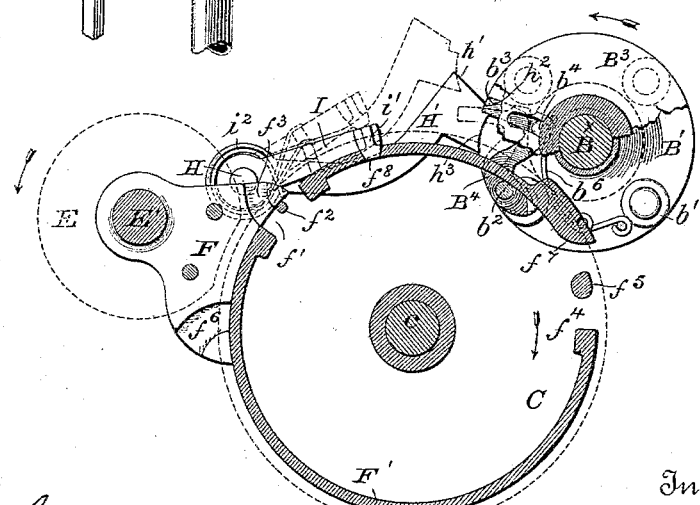
Figure 2:
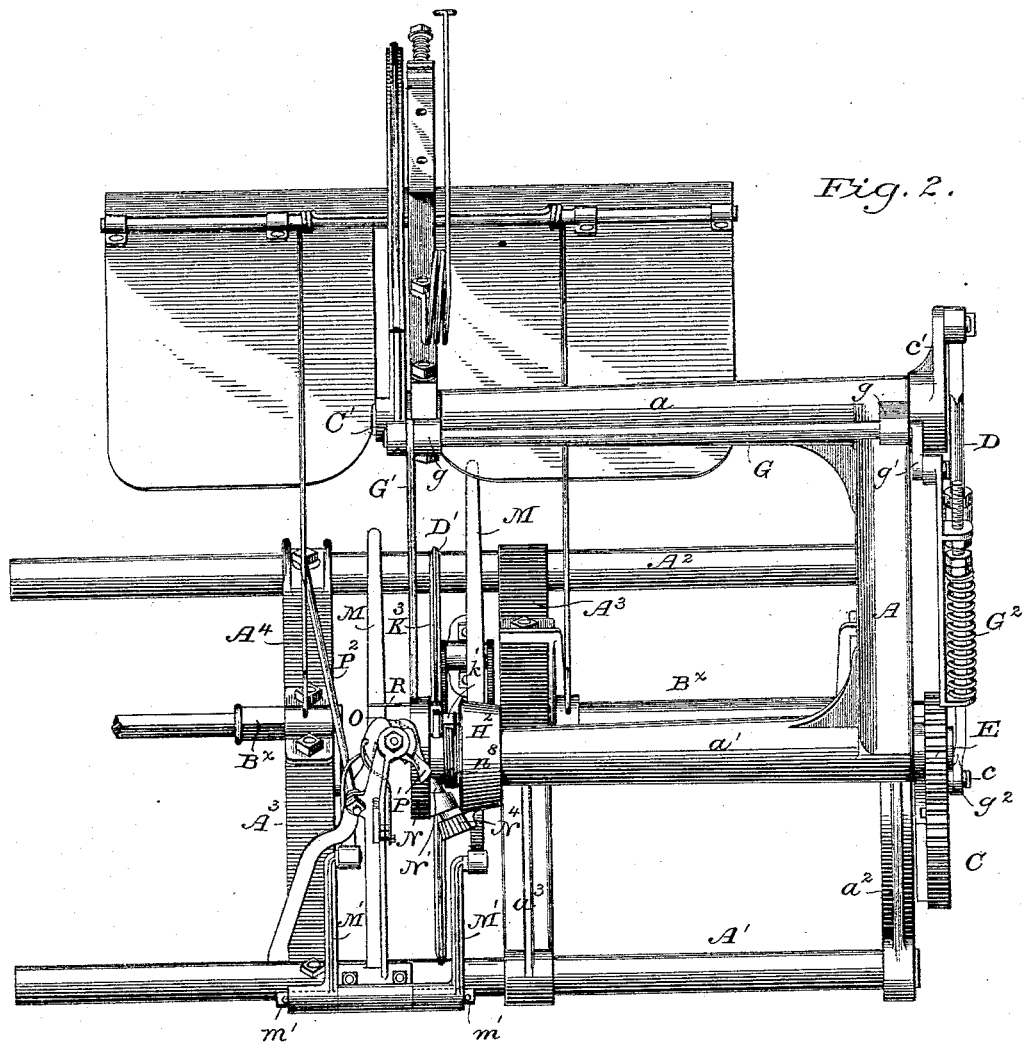
Figure 3:
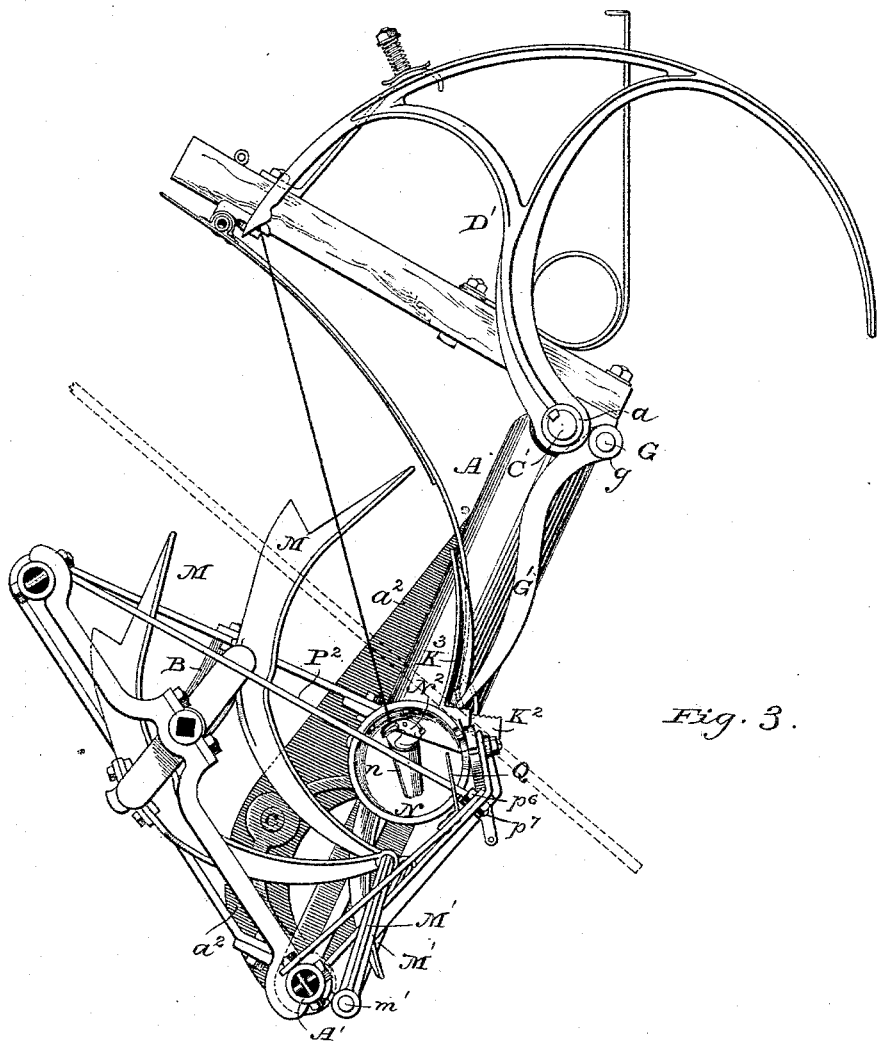
Figure 26:
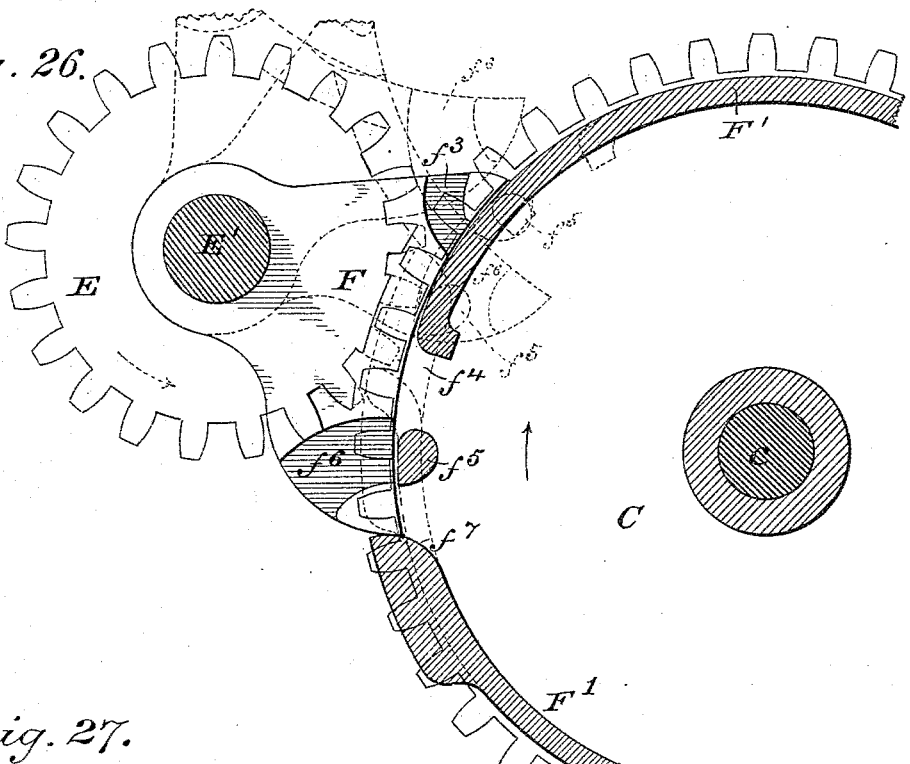
Figure 27:
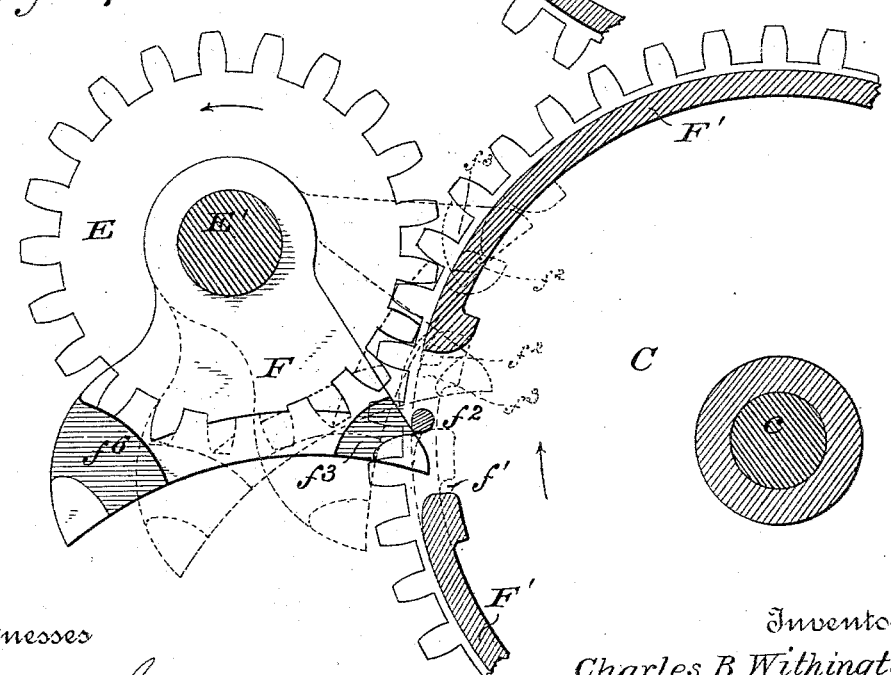

In the drawings, Figure 1 is a top plan view of a grain-binder constructed according to my invention, the binder-arm being broken away in section and the decking removed. Fig. 2 is an elevation of said machine from the stubble side, the decking being still omitted; Fig. 3, a rear end elevation showing the cord running from the holder beneath the chin of the knotter and thence to the binder-arm; Fig. 4, a front elevation explaining particularly the manner of driving the binding mechanism from the harvester; Fig. 5, an enlarged detail view, partly in section, on the correspondingly-numbered line in the preceding figure, and seen from above, showing the driving-train, the tripping mechanism, the tyer-shaft, and the tyer-head, but omitting the knotter and holder; Fig. 6, an enlarged detail in elevation from the rear and sectioned on the line indicated by like numerals in the preceding figure, explaining particularly the compressing, tripping, and ejecting mechanism; Fig. 7, a section on the line 7 7 of Fig. 5, also enlarged and seen from the front; Fig. 8, a section, enlarged, on the line likewise numbered in Fig. 5, showing the trip-clutch, the stop-motion in the driving-train, and the locking-dog; Fig. 9, a detached view, enlarged and in front elevation, of the stop-motion pinion by which the compressor is actuated. Fig. 10 represents the same from above. Figs. 11 and 12 are projections in section and plan of the delay-rim on the side of the main gear whereby said stop-motion pinion is controlled. Fig. 13 is an elevation of the knotter-head from the rear, enlarged, with its revolving stock partly broken away to expose the stationary gear-segment by which the tyer-spindle is rotated; Fig. 14, a section through said knotter-head longitudinally of the tyer-shaft, as indicated in the preceding figure; Fig. 15, an irregular section through the knotter-head on the line denoted by same numeral in the last preceding figure; Fig. 16, an enlarged detail of the holder, in section on the line 16 16 of preceding figure; Fig. 17, a section through the foregoing figure, as indicated by numbered line and arrows therein; Fig. 18, a detached view, in perspective, of the stripper and fag-chute for the holder; Fig. 19, an elevation, partly in section, of the knotter or tying-bill; Figs. 20 to 25, a diagrammatic series illustrating in consecutive order the successive stages of action of the knotting-head from the moment the tying-bill commences to revolve until the band is tied, its ends severed, and the knot at the point of being wrenched from the tying-jaws; and Figs. 26 and 27, enlarged diagrammatic views of the stop-motion in the driving-train, the first showing the pinion in full lines as it is about to commence its revolution and tracing it a quarter-revolution by broken lines, and the second showing said pinion in full lines as it is entering the last quarter of its revolution and tracing its movement to nearly the initial position of rest by broken lines.

A is the post-frame or main bracket, having an overhung arm, $a$, and lower parallel arm, $a'$, subtending the grain-table or decking, as usual, these arms respectively affording bearings for the needle-shaft and tyer-shaft, as presently explained. An insetting web or flange, $a^2$, from the upright part or post of this main bracket depends or downhangs below the subtending arm, and at its foot has a seat for the outer longitudinal frame-bar, $A'$, and a corresponding hanger, $a^3$, from the inner or rear end of the subtending arm completes the connection with said bar. A second parallel frame-bar, $A^2$, on the inner side of the main bracket is connected with the first by metal straps or transverse frame-bars $A^3$, conveniently formed by bending, as shown, to bring the two ends, respectively, to the outer frame-bar and subtending arm of the main bracket, and to receive the inner frame-bar in the seat afforded at the re-entrant angle of the bend. Other metal bars or straps, $A^4$, or it may be wooden bars, for the matter of that, unite the longitudinal frame-bars in rear of the post-frame. Tie-pieces B, uniting the two arms of the transverse frame-bars, have bearings $b$ for the cranked packer-shaft driven from the harvester, and which carries at its front end, adjacent to the post of the main bracket, the driving-disk $B'$, provided with driving studs or rollers $b'$, and the loose-running trip-pinion $B^2$, having integral therewith or fixed fast thereto a disk or cross-head, $B^3$, that carries the driving-dog $B^4$, pivoted by a pin, $b^2$, to said disk. This driving-dog is formed with an arm, $b^3$, outsetting from its end about radially to the shaft, to engage the trip-latch, a lateral pin, $b^4$, which takes into a slot in the cross-head to limit the vibration of the dog on its pivot, and a lateral driving-lug, $b^5$, and is normally pressed outward by means of a spring, $b^6$, fixed to said cross-head to bring the driving-lug into engagement with one of the pins or rollers upon the driving-disk.

Formerly the trip-pinion has driven a main gear and cam wheel fixed to a tyer-shaft in the overhanging arm of the main bracket by means of two intermediate idle-wheels, or else by a chain driving a pinion in mesh with said main gear. Herein, however, I mount the main gear C upon a stub-axle, $c$, outsetting from the front hanger beneath the post-frame, so as to bring said main gear directly in mesh with the trip-pinion, and, instead of placing the tyer-shaft in the overhung arm of the post-frame, journal the needle-shaft C' therein and connect a crank, $c'$, at the front end of this needle-shaft with the main gear by means of a pitman, D, so that with each revolution of the main gear the needle or binder arm D' at the rear end of said shaft, and not necessarily differing in construction from that heretofore employed, shall be carried down from its position of rest (shown, for instance, in Fig. 3) to pierce the grain and deliver the cord to the knotter and holder beneath the binding-table and afterward return again to its position of rest.

On the side away from the trip-pinion or driving-pinion the main gear meshes with a stop-motion pinion, E, keyed to the forward end of the tyer-shaft E', journaled in the subtending arm of the main bracket. This stop-motion pinion has a shoe, F, which travels on a delay rim or flange, F', on the inner face of the main gear, and opposite the shoe has a blank space or cut-away portion, $f$, in which the teeth of the main gear may revolve while the shoe is traveling upon said flange or delay-surface.

Reference to Fig. 8 will give the relation of the delay-shoe and delay-flange in the position of rest or in the interval when the main gear is out of action. The flange is slotted out at $f'$ underneath the rear toe of the shoe, and midway in this slot or blank space a pin, $f^2$, projects laterally from the main gear about half the width of the flange, as shown in the projection thereof in Fig. 12, the object of this pin being to come under the extreme end of the toe at the moment that the main gear stops, so as to support it and prevent any possible retrograde movement of the pinion, while the toe has a lateral channel, $f^3$, about half through its thickness that allows the passage of the pin while said toe is engaging with and playing through the slot. From this point the flange extends a little more than half a circle around the main gear, so as to lock the pinion against revolution in the initial movement of said main gear that brings the binder-arm down and delivers the cord, then is slotted or cut away again, as at $f^4$, having also in the middle of this cut-away space a laterally-projecting supporting-pin, $f^5$, as before, upon which the advancing toe first rides to insure against premature movement of the stop-motion pinion, and which is received in a lateral channel, $f^6$, in said advancing toe when the latter engages with and plays in the recess. On the farther edge of the slot the flange is thickened into a sort of cam, $f^7$, that with its curved or rounded end catches the curved surface of the advancing toe and trips or deflects it into the recess, so as to cause the perfect engagement of the pinion with the main gear. Beyond this thickened part the flange is continued, though not necessarily so, since the pinion is revolving along this reach and the delay-shoe does not again engage with the flange until it reaches the initial slot or break, and at a point in this continuation is notched or formed a socket, $f^8$, to receive the nose of the locking-dog, as presently explained. The pinion reaches the initial slot in the delay-flange after imparting to the tyer-shaft a single revolution, and thereby operating the knotter, and also actuating the compressor, as next explained. Then it passes out of engagement, its delay-shoe once more locks upon the delay-flange with the thickened extremity of the rear toe again resting on the pin $f^2$, and the main gear itself stops.

In ears $g$ on the outer side of the overhung arm of the post-frame is journaled a rock-shaft, G, having at its rear end the compressor-arm G' and at its forward end a crank, $g'$, connected by a yielding link or pitman, $G^2$, with a wrist-pin, $g^2$, upon the stop-motion pinion, and in the position of rest slightly in advance or precedence of the dead-center, so that when this pinion passes off the delay-flange and commences to revolve, which will be at the moment when the binder-arm has completed its descent and presented the cord to the knotter and to the holder, the link may first be drawn down, carrying the compressor in against the gavel to give it an additional compression against the binder-arm, thus providing slack in the band just laid, to be taken up by the knotter in its revolution, which of course commences synchronously with the revolution of the stop-motion pinion. After the yielding pitman has passed the dead-center the knot will have been formed, and the compressor then opens away from the bound sheaf rapidly, and will at the moment the pitman reaches the opposite dead-center be elevated to practically the full height above the grain-table. Then it is carried down again sharply until it reaches its position of rest, closing the exit-passage from the binding-receptacle, and awaiting the accumulation of another gavel.

Mounted in bearings $h$ on the inner side of the subtending arm of the main bracket is another rock-shaft, H, serving as the trip-shaft. At its outer end it carries the trip-latch H', formed with an abrupt abutting face, $h'$, which strikes the upstanding arm or finger of the trip-dog and depresses it, and at the lower end of this face having a notch, $h^2$, to receive and catch over said end, as shown in Fig. 6, and beyond the notch being beveled downwardly, as at $h^3$, that it may ride upon the shank of the trip-dog prior to striking the arm thereof and be directed against said arm. This trip-latch is normally urged upward or out of action by means of a spring, $h^4$, coiled about the trip-shaft, and pressing at one end against the lower end of the latch and at the other seated against any suitable support on the main bracket, my tripping arrangement being distinguished in this feature from many others with the common tripping mechanism now used, where the latch is normally urged into engagement by the spring. The inner end of the trip-shaft, or that end adjacent to the path of the needle, has a crank-arm, $h^5$, curved upward and over the trip-shaft, or over the subtending arm of the main bracket, and herein, though not necessarily so, playing in a slot, $h^6$, in a box or casing, $H^2$, fixed to or integral with said subtending arm at its rear end, or that end which in the relations of the machine may be termed the "inner end."

Upon the end of the trip-shaft adjacent to the trip-latch, or it may be upon the insetting web of the main bracket, is pivoted the locking-dog I, having about midway of its length a lateral finger, $i$, which sits over and rests upon the trip-latch, and at its free end is bent outward to bring its nose $i'$ over the flange on the main gear, that it may drop into the before-mentioned notch cut therein as the gear ends its revolution and lock it against motion in either direction. A spring, $i^2$, coiled around the hub of this locking-dog presses at one end against the lateral finger therefrom and at the other against the under side of the trip-latch, so as to hold the dog down against the trip-latch and cause it to follow the descent of the latter, that it may be brought down against the flange on the main gear and ride thereon ready to engage with its notch the instant the trip-dog is thrown out of action, and that when the trip-latch is lifted by its own stronger spring it may positively lift the locking-dog and release the main gear.

Mounted upon the tyer-shaft, which so far as the tripping mechanism is concerned may be a needle-shaft, as ordinarily used in this position, or upon a hub surrounding it, is a sleeve, K, having a pendent outwardly-curved finger, K', acting as the discharge-arm, and opposite this finger having a tangential arm, $K^2$, directed outward, and serrated, notched, or otherwise prepared to receive and support an adjustable trip finger or lever, $K^3$, that may be set nearer to or farther from the center of the hub by means of the set-screw $k$ or equivalent securing device. A lateral finger, $k'$, also projects from the trip-support parallel with the tyer-shaft until its end enters within the casing and beyond the plane of vibration of the crank-arm on the trip-shaft, so that when the binder is at rest this finger may lie beneath said crank-arm, forcing it out and holding the trip-latch at the other end of the trip-shaft down against the trip-dog. The sleeve has a recess or notch, $k^2$, to receive a stop from its bearing, whereby it may be limited in its playing thereabout. In the present instance this stop is afforded by the spindle of the tying-bill, which is caused to pass diagonally through the notch; but under a different arrangement of mechanism, as where a needle-shaft is substituted for the tyer-shaft, any suitable pin or lug will take the place of said spindle in its office as a stop. A spring, L, is coiled about this sleeve, and at one end is hooked into one of a series of sockets, $l$, upon a flange, L', outset from a disk revolving with the tyer-shaft, or is otherwise adjustably secured that its tension may be increased or decreased, while at the other end it presses against the lateral finger from the trip-support and tends to hold it inward to resist the pressure of the grain.

Grain being packed into the receptacle and against the trip-lever, the latter will yield according to the tension of its spring, and finally will rock its supporting-sleeve so far as to carry the lateral finger out from beneath the cranked end of the trip-shaft, when the spring on the latter will immediately lift the trip-latch from engagement with the trip-dog, and thereby start the trip-clutch, the trip-latch as it rises disengaging the locking-dog, so as to release the main gear. In the ensuing revolution of the tyer-shaft, coming at some interval after the engagement of the clutch, the trip-lever will be carried down beneath the table, and finally brought up again to its position of rest, its lateral finger entering beneath the crank-arm from the trip-shaft and rocking the latter against its spring to bring the trip-latch into the path of the trip-dog, while the ejector-finger, mounted on the same hub, but opposite the trip-finger, will first be brought up to discharge the bound sheaf and then down and around to its starting position.

The packers, M, which I employ are similar in outline to those heretofore used, and, like them, are each journaled about midway of their length upon oppositely-set cranks $m$ on the driving-shaft of the binder, that they may act alternately and carry the grain wisp by wisp against the trip-lever; but whereas the heels of the packers heretofore used have been supported by pendent links from overhead pivots on the binder-frame, in my invention these heels are carried upon links or radius-bars M', upstanding from pivots $m'$ in ears from the lower or outside longitudinal supporting-bar of the binder-frame, thus bringing them up in close proximity to the decking and raising them above the base-bars of this frame, instead of projecting them beneath them, as formerly, where they occupied much space and were in danger of being struck and bent or broken. This mode of arranging and supporting the packers also involves a change in their path which benefits their action and facilitates their withdrawal from the grain at the end of the packing movement.

Pinned fast to the end of the tyer-shaft by means of a hub, $n$, the exterior surface of which herein serves as a bearing for the just-mentioned trip-sleeve, is a disk, N, serving as a stock for the tying-bill. A diagonal bearing, $n$, runs through this sleeve from one face to the other, and preferably in a diametrical plane, in which is mounted the tyer-spindle N', carrying at its upper end and at the outer or rear face of the disk a tying-bill, $N^2$, which may be of any approved form, but herein is shown as composed of a fixed under jaw, $n'$, and a pivoted outer jaw, $n^2$, having a roller, $n^3$, on its heel end, and normally held closed by means of a leaf-spring, $n^4$, secured within the hollow spindle by a screw, $n^5$, and having between said screw and its power end a shoulder, $n^6$, whereby its tension may be adjusted by turning the screw to give the jaws a greater or less grip upon the cord.

A lug or offset, $N^3$, on the adjacent face of the disk has a cam-surface, $n^7$, arranged to strike the heel of the pivoted jaw or the roller thereon at the proper moment in the revolution of the tyer-spindle to open said jaw that it may grasp the crossed strands of the cord, and when the jaw has passed off this cam the spring instantly closes it to grasp said ends. The lower end of the tyer-spindle has, as usual, a bevel-pinion, $N^4$, and a delay-shoe, $N^5$, the pinion engaging with a stationary segment-rack, $N^6$, formed upon the adjacent rim of the above-mentioned casing, and the delay-shoe riding upon a beveled delay-surface, $n^8$, afforded by the remaining periphery of said rim as the disk is carried around by the revolution of the tyer-shaft. When in position to receive the cord, the tyer-spindle inclines slightly inward, as shown in Fig. 13, with the tying-jaws trending obliquely inward across the plane in which the cord is laid, and with the tyer-pinion just ready to engage with the actuating-segment, and in such position the knotting-head will remain, owing to the stop-motion between the main gear and the tyer-shaft, until the binder-arm has descended and carried the cord to the holder on the outer side of the tying-head.

For the holder I prefer to employ the ordinary notched disk, O, working in a shoe, O', pressed against the periphery of said disk by means of a spring, $o$, all being mounted upon a bracket or support, $o'$, bolted to the fixed frame-work of the machine. In the present instance the holder-disk has but three notches, though it may have more, and is turned by means of a Geneva stop-pinion, P, fixed to its spindle $p$, and having three delay-shoes, $p'$, with notches $p^2$ between. The rim of the discoidal tying-head is formed with a delay flange or surface, $p^3$, upon which the delay-shoes of the holder-pinion travel in succession, and at a proper point along the length of said rim is placed a solitary tooth, $p^4$, at each side or flank of which the flange is cut away to permit its engagement with a notch in the holder-pinion. Thereby said pinion is turned one-third of a revolution for each entire revolution of the tying-head or tyer-shaft, or, in other words, makes a complete revolution once for every three binding operations.

Between the holder-disk and its pinion is a stripper-plate, P', herein made integral with the support or bearing for the holder-spindle, and practically embracing said bearing on the side away from the holder-shoe, and rising spirally from a point close to the periphery of the spindle until it passes beyond the periphery of the disk, then broadened and prolonged into a fag-chute, $p^5$, whereby the débris is conducted away from the vicinity of the holding mechanism and danger of clogging is avoided.

The support or bracket for the holder is braced from the inner bar of the main frame or binder-frame by means of a rod, $P^2$, screw-threaded at that end which passes through the support and receiving two nuts, $p^6$ and $p^7$—one on each side of the support—whereby the holder may be slightly adjusted with reference to its distance from the axis of the tyer-shaft, to insure proper engagement of its pinion with the flange upon the rotating stock of the latter.

From the holder-bracket rises an arm or finger, Q, which at about the head of the axis of the holder-spindle is bent laterally and nearly horizontally toward the tyer-head, terminating beneath the chin of the knotter, the office of this arm being to stop the cord-strands brought around by the revolution of the holder-disk and retain and guide them into position to come between the open jaws of the tying-bill after the loop has been laid and these ends crossed thereon.

Figure 20:
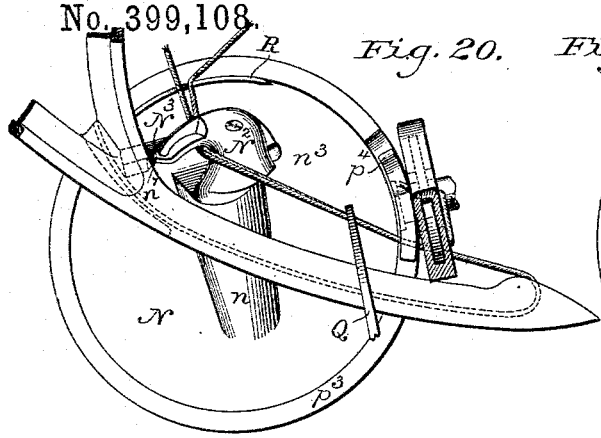
Figure 23:
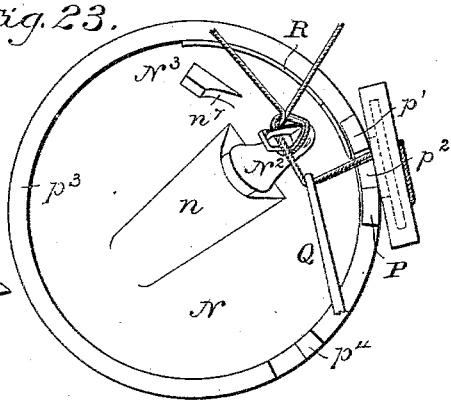
Figure 21:
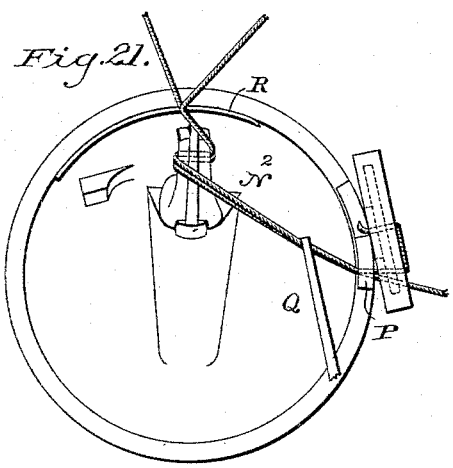
Figure 24:
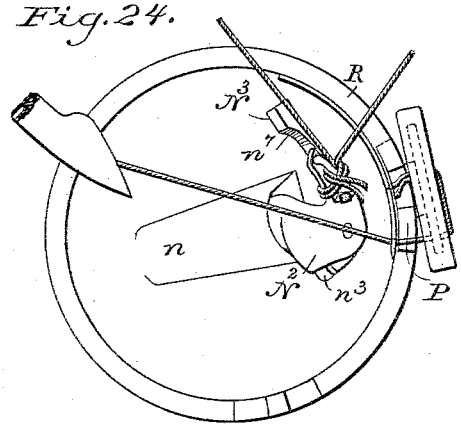
Figure 22:
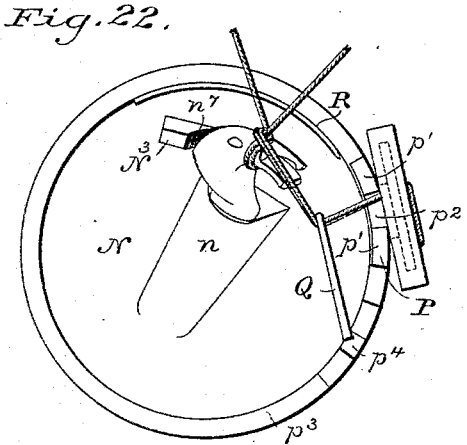
Figure 25:
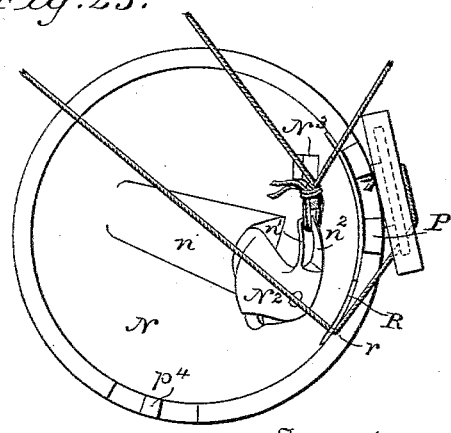

It has already been stated that the knotter-jaws in their position of rest trend obliquely inward across the plane in which the band is laid, and their spindle being inclined causes them also to trend downward. This brings the nose of the jaws to the farther side of the binder-arm when the latter descends, as will perhaps be more clearly understood by reference to Figs. 14 and 20, the first of which, seen from the direction in which the binder-arm comes, shows the holder-disk ready to receive the cord, with the waiting notch in line with the chin of said tyer-jaws, and the second shows the binder-arm at the extreme of its descent, at just the moment when the knotter begins to revolve. The adjustment of the binder-arm is also such that as it passes the knotter the jaws of the latter come close to and almost scrape its inner or concave side—at the outer edge of course. Therefore the cord is certainly laid under the chin of the jaws without possibility of escape. When thus laid, it does not at the moment come in contact with the guide finger or stop between the holder and knotter; but in the ensuing fractional revolution of the holder-disk it is carried around and up against the under side of said finger, which stops both strands, the old strand and the one just laid and lying in the same notch, so that they shall be held in position to be grasped by the open knotter-jaws as the latter come around after laying the loop. When this has been done, the knife R, secured to the rim of the discoidal knotter-head above the crown of the knotter and projecting across the plane in which the band is laid by the binder-arm, comes against and severs the two strands between this finger and the holder, as indicated in Fig. 24, but temporarily receives the spool-strand left by the just commencing recession of the binder-arm and belayed through the next notch, and therefore not alongside the two just severed, in a recess or notch, $r'$, in its shank right above the crown of the knotter, and as it is carried down and around in the revolution of the stock retains this strand until it has been safely guided beneath the chin of the knotter ready for the ensuing binding operation, when, as it rises to its position of rest with the termination of the movement of the tyer-shaft, it passes off of the strand, leaving it securely engaged with the knotter and waiting for its companion strand to be brought down by the binder-arm. With the accumulation of the incoming gavel the strand stretched from the holder under the chin of the knotter and up to the eye of the binder-arm is pressed outward until it comes against the back of the knife, as shown in Fig. 20, which prevents its further escape until the second strand is brought down alongside of it by the descent of the binder-arm, when, in the incipient revolution of the knotter, the second strand will be carried against the back of the knife, and both strands will be retained thereby immediately over its crown, as in Fig. 21, until the loop has been formed or nearly formed, when the rotation of the stock will carry knife and knotter down toward and past the holder, and the strands will be severed, and the spool-strand caught and carried around and up and guided under the chin of the knotter, as before.

I claim—

1. The combination, substantially as hereinbefore set forth, of the trip-pinion on the packer-shaft, the trip-latch, the main gear, with which said pinion directly meshes, the delay-flange on its side, the tyer-shaft, and the delay-pinion on said tyer-shaft directly meshing with the main gear.

2. The combination, substantially as hereinbefore set forth, of the trip-pinion on the packer-shaft, the main gear meshing directly therewith, the binder-arm mounted on an overhead shaft, the pitman connecting the main gear with an arm on said shaft, the parallel compressor-shaft, the delay-pinion on the tyer-shaft directly meshing with the main gear, and the link connecting said delay-pinion with an arm from the compressor-shaft.

3. The combination, substantially as hereinbefore set forth, of the trip-pinion on the packer-shaft, the trip-latch, the main gear, with which said trip-pinion directly meshes, the tyer-shaft, the delay-pinion on said tyer-shaft, having a shoe engaging a delay-flange on the main gear and itself meshing directly with the teeth of said main gear, the binder-arm shaft, and a pitman connecting the wrist-pin on the main gear with an arm from said shaft.

4. The combination, substantially as hereinbefore set forth, with the delay-pinion and its shoe having lateral channels in its toes, of a driving-gear having a delay-flange provided with supporting-pins at the center of the cut-away spaces therein, projecting to about half the thickness of the shoe to support it after it has passed through said cut-away spaces.

5. The combination, substantially as hereinbefore set forth, with the trip-pinion, trip-clutch, and pivoted trip-latch, and with a wheel in the train driven by said pinion and between said pinion and the band applying and uniting devices, of the locking-dog independently pivoted to the frame and taking into a notch in said wheel, and an arm from said locking-dog projecting into the path of the independent trip-latch, whereby it will be lifted when the trip-latch is moved to release the driving-dog.

6. The combination, substantially as hereinbefore set forth, with the trip-clutch and trip-latch, of the rock-shaft upon which said trip-latch is secured, the spring pressing the trip-latch normally away from the path of the trip-dog, the arm from the inner end of the trip-shaft resting adjacent to the periphery of the shaft, which is carried in the subtending arm of the binder-frame, and a finger normally resting under said arm to hold the latch into engagement and partaking of the motions of said subtending shaft, whereby after disengagement it is brought up again beneath the heel of said arm and again resets the trip-latch.

7. The combination, substantially as hereinbefore set forth, with the trip-latch, the trip-shaft, and the spring which urges said trip-latch out of the path of the trip-dog, of the arm at the inner end of the trip-shaft, the trip-lever mounted upon a support sleeved about the shaft carried in the subtending arm of the binder-frame, the finger projecting laterally from said support under the arm from the trip-shaft, means whereby said sleeve is permitted a limited play about its supporting-shaft, and a spring holding it resistingly against such play, that as the grain is packed against the trip-finger it may yield and overcome the spring, carrying the lateral arm or finger out from beneath the arm from the trip-shaft, and then be taken around to come up on the other side of said arm in the ensuing revolution of its supporting-shaft.

8. The combination, substantially as hereinbefore set forth, with the trip-finger carried upon the inner end of the shaft in the subtending arm of the binder-frame, the trip-shaft extending alongside and parallel with said subtending frame-arm to the inner end of the shaft which the latter carries, the arm from the inner end of said trip-shaft, and the sleeve encircling the inner end of the subtending shaft where it projects from the frame-arm and carrying the trip-finger, of the discharge-arm projecting rigidly from the other side of said sleeve, whereby as the trip-lever is carried around after starting the binder the discharge-arm is brought up into its place to eject the bound sheaf, and then returns beneath the binder as the trip-lever comes up to its initial position.

9. The combination, substantially as hereinbefore set forth, with the driving-dog, trip-latch, trip-shaft, and its arm, and with the subtending shaft of the binder, of the sleeve K, tangential supporting-bar $K^2$, the trip-lever $K^3$, supported upon and adjustable along said tangential supporting-bar, the spring L, and a device for adjusting the stress of said spring.

10. The combination, substantially as hereinbefore set forth, with the tyer-shaft, of a knotter-stock fixed thereto to revolve therewith, a tying-bill carried by said stock, and means whereby said bill is rotated upon its own axis during a portion of the revolution of the stock.

11. The combination, substantially as hereinbefore set forth, with the tyer-shaft and with the revolving knotter-stock carried thereby, of the tyer-spindle set obliquely in said stock, the pinion and delay-shoe on one end of said spindle, a segment-gear and delay-flange secured to the binder-frame, with which said pinion and shoe engage, the tying-bill at the head of said spindle, and a cam carried by the revolving stock, with which the heel of the pivoted jaw engages as the bill is rotated to open said jaw.

12. The combination, substantially as hereinbefore set forth, with the tyer-shaft and the revolving stock mounted thereon, of the tyer-spindle, the tying-bill at the head thereof, the stationary holder, and means whereby the tyer-spindle is rotated to form the knot as it is approaching the holder, and stopped in its individual rotation with the jaws trending toward the holder immediately after it passes thereby to strip and tighten the knot as the stock continues to revolve.

13. The combination, substantially as hereinbefore set forth, with the tyer-shaft and the revolving stock mounted thereon, of the obliquely-set tyer-spindle, the tying-bill at the head thereof, the stationary holder, and means whereby the tyer-spindle is rotated to form the knot as it is approaching the holder, and stopped in its individual rotation with the jaws trending toward the holder immediately after it passes thereby to strip and tighten the knot as the stock continues to revolve.

14. The combination, substantially as hereinbefore set forth, of the tyer-shaft, the revolving tyer-stock carried thereby, the tying-bill mounted in said stock, the stationary holder comprising a notched disk and shoe, the Geneva stop-pinion upon the holder-spindle, and the delay-flange and tooth upon the revolving knotter-stock engaging with said pinion to actuate the holder.

15. The combination, substantially as hereinbefore set forth, with the revolving knotter-stock and the tying-bill carried thereby, of the stationary holder and the cord-stop between said holder and the knotter, whereby the cord-strands are retained in position to pass between the open jaws of the tying-bill as it approaches the holder.

16. The combination, substantially as hereinbefore set forth, with the revolving knotter-stock and tying-bill carried thereby, of the knife mounted upon said stock above the crown of the tying-bill, projecting across the plane in which the cord is laid by the binder-arm, and serving to retain the cord-strands prior to the knotting movement.

17. The combination, substantially as hereinbefore set forth, with the tying-bill, the revolving stock in which it is mounted, and the stationary holder, of the knife carried by said stock above the crown of the tying-bill and projecting across the plane in which the cord is laid by the binder-arm, and having a notch in its shank to receive the spool-strand as it passes the holder and deflect it into position to spring beneath the chin of the knotter.

CHAS. B. WITHINGTON.

Witnesses:
B. F. DUNWIDDIE,
D. DUNWIDDIE.